(12) United States Patent
Ikematsu (10) Patent No.: US 6,934,295 B2
(45) Date of Patent: Aug. 23, 2005

(54) MULTI-MODE SCHEDULER, APPARATUS INCLUDING MULTI-MODE SCHEDULER AND MULTI-MODE SCHEDULING METHOD

(75) Inventor: Ryuichi Ikematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 09/779,744

(22) Filed: Feb. 9, 2001

(65) Prior Publication Data

US 2001/0014098 A1 Aug. 16, 2001

(30) Foreign Application Priority Data

Feb. 9, 2000 (JP) ........................................ 2000-031347

(51) Int. Cl.⁷ ............................................. H04L 12/28
(52) U.S. Cl. ..................................... 370/416; 370/376
(58) Field of Search ................................ 370/412–414, 370/416, 418, 375–377

(56) References Cited

U.S. PATENT DOCUMENTS

| | | | | |
|---|---|---|---|---|
| 5,140,582 A | * | 8/1992 | Tsuboi et al. | 370/416 |
| 5,255,265 A | * | 10/1993 | Eng et al. | 370/416 |
| 5,590,123 A | * | 12/1996 | Lyles et al. | 370/397 |
| 5,923,656 A | * | 7/1999 | Duan et al. | 370/395.4 |
| 5,959,993 A | * | 9/1999 | Varma et al. | 370/397 |
| 6,185,221 B1 | * | 2/2001 | Aybay | 370/412 |

OTHER PUBLICATIONS

K. Isoyama et al., "A Proposal of Multi Priority Packet Switch Fabric", The Institute of Electronics, Information and Communication Engineers, Technical Report of IEICE, SSE99–120, PS99–44, (Dec. 1999), pp. 55–66 with English Abstract.

* cited by examiner

Primary Examiner—Ricky Ngo
Assistant Examiner—Nittaya Juntima
(74) Attorney, Agent, or Firm—Sughrue Mion, PLLC (57) ABSTRACT

In a multi-mode scheduler including a N×kM scheduler for adjusting data transmission between N-pieces of input interface sections and kM-pieces of output interface sections, the multi-mode scheduler, k-pieces of N×M schedulers to be the N×kM scheduler, and (k−1)-pieces of selection circuits for switching allocated output port information input from an outside of the N×kM scheduler and information from a N×M scheduler at front step, so as to be input to the N×M scheduler as allocated output port information, and two operations are set freely with a switching operation of the selection circuits. As a result, it is possible to provide a general scheduler.

17 Claims, 9 Drawing Sheets

MULTI-MODE SCHEDULER, APPARATUS INCLUDING MULTI-MODE SCHEDULER AND MULTI-MODE SCHEDULING METHOD

BACKGROUND OF THE INVENTION

1. Field of the Invention

The present invention relates to a multi-mode scheduler, an apparatus including a multi-mode scheduler and a multi-mode scheduling method and more particularly to a scheduler used for a communication infrastructure and controlling an input buffer switch.

The present application claims priority of Japanese Patent Application No. 2000-031347 filed on Feb. 9, 2000, which is hereby incorporated by reference.

2. Description of the Prior Art

As an internet has come into wide use drastically, a drastic change of a public infrastructure has been required, and there fore, there is a growing tendency for the internet to be used as a communication infrastructure.

In order to use the internet as the communication infrastructure, it is necessary to provide extendibility of service nodes (routers) in accordance with an increment of traffic and to provide a plurality of service qualities, and it is also necessary for a scheduler to deal with two requirements.

As a technique carrying out a switch of the router as the communication infrastructure, an input buffer switch using a VOQ (Virtual Output Queuing) has an advantage.

As a technique carrying out the extendibility, there is a technique discussed in Electronic Communication Society Technical Research Report (SSE99-121, Dec. 16, 1999). As a technique providing the plurality of service qualities, there is a technique discussed in Electronic Communication Society Technical Research Report (SSE99-120, Dec. 16, 1999). However, these reports deal with either the extendibility or the plurality of service qualities.

In a conventional scheduler, when the internet is used as the communication infrastructure, it is required to cope with the extendibility of service nodes (routers) in accordance with the increment of traffic and to provide the plurality of service qualities. Generally, extendibility is required for a base router and the plurality of service qualities is required for a subscriber router.

However, any conventional schedulers which serve extendibility cannot serve the plurality of service qualities. In contract, any another conventional schedulers which serve the plurality of service qualities cannot serve extendibility.

SUMMARY OF THE INVENTION

In view of the above, it is an object of the present invention to provide a multi-mode scheduler capable of coping with both of a router required for extendibility of a number of ports and a router required for priority control over a plurality of classes and capable of carrying out a general scheduler.

According to a first aspect of the present invention, there is provided a multi-mode scheduler including a N×kM scheduler for adjusting data transmission between N-pieces of input interface sections (input interface means), where N is a positive integer, and kM-pieces of output interface sections (output interface means), where M is a positive integer and k is an integer not less than two, the multi-mode scheduler including:

k-pieces of N×M schedulers to be the N×kM scheduler; and (k−1)-pieces of selection circuits (selection means) for switching allocated output port information input from an outside of the N×kM scheduler and information from the N×M scheduler at the front step so as to be input to the N×M scheduler as allocated output port information:

wherein an operation of the N×kM scheduler or an operation of the N×M scheduler having k-pieces of priority classes is set freely with switching operation of the (k−1)-pieces of selection circuits.

In the foregoing, a preferable mode is one wherein j-pieces of the N×kM scheduler (where j is an integer not less than two) are connected so as to make up the jN×kM scheduler when the allocated output port information input from the outside is used.

Also, a preferable mode is one wherein each of the (k−1)-pieces of selection circuits selects the allocated output port information input from the outside when the allocated output port information is input from the outside.

Also, a preferable mode is one wherein j-pieces of the N×kM scheduler are pipeline-connected so as to make up the jN×kM scheduler (where j is an integer not less than two).

Also, a preferable mode is one wherein the N×kM scheduler is used alone so as to make up the N×M scheduler having k-pieces of priority classes when information from the N×M scheduler at the front step is used.

Also, a preferable mode is one wherein each of the (k−1)-pieces of selection circuits selects information from the N×M scheduler at the front step when the N×kM scheduler is used alone.

Furthermore, a preferable mode is one wherein each of the N-pieces of input interface sections includes a VOQ (Virtual Output Queue) buffer for storing reception data for each output interface section to be a destination.

According to a second aspect of the present invention, there is provided an apparatus including a multi-mode scheduler including a N×kM scheduler for adjusting data transmission between N-pieces of input interface sections, where N is a positive integer, and kM-pieces of output interface sections, where M is a positive integer and k is an integer not less than two, the multi-mode scheduler including:

k-pieces of N×M schedulers to be the N×kM scheduler; and (k−1)-pieces of selection circuits for switching allocated output port information input from an outside of the N×kM scheduler and information from the N×M scheduler at the front step so as to be input to the N×M scheduler as allocated output port information:

wherein an operation of the N×kM scheduler or an operation of the N×M scheduler having k-pieces of priority classes is set freely with switching operation of the (k−1)-pieces of selection circuits.

According to a third aspect of the present invention, there is provided a multi-mode scheduling method used in a N×kM scheduler for adjusting data transmission between N-pieces of input interface sections, where N is a positive integer, and kM-pieces of output interface sections, where M is a positive integer and k is an integer not less than two, the multi-mode scheduler including:

k-pieces of N×M schedulers to be the N×kM scheduler; and (k−1)-pieces of selection circuits for switching allocated output port information input from an outside of the N×kM scheduler and information from the N×M scheduler at the front step so as to be input to the N×M scheduler as allocated output port information:

wherein an operation of the N×kM scheduler or an operation of the N×M scheduler having k-pieces of priority classes is set freely with switching operation of the (k−1)-pieces of selection circuits.

With the above configurations, in a multi-mode scheduler including a N×kM scheduler for adjusting data transmission between N-pieces of input interface sections, where N is a positive integer, and kM-pieces of output interface sections, where M is a positive integer and k is an integer not less than two, the multi-mode scheduler, k-pieces of N×M schedulers to be the N×kM scheduler, and (k−1)-pieces of selection circuits for switching allocated output port information input from an outside of the N×kM scheduler and information from the N×M scheduler at the front step so as to be input to the N×M scheduler as allocated output port information are provided, and an operation of a N×kM scheduler or an operation of the N×M scheduler having k-pieces of priority classes are set freely with switching operation of the (k−1)-pieces of selection circuit. As a result, it is possible to deal with both of a router for which expandability of a number of ports is required and a router for which priority control among priority classes is required, and therefore it is possible to produce a general scheduler.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using various embodiments with reference to the accompanying drawings.

First Embodiment

Figure 1:
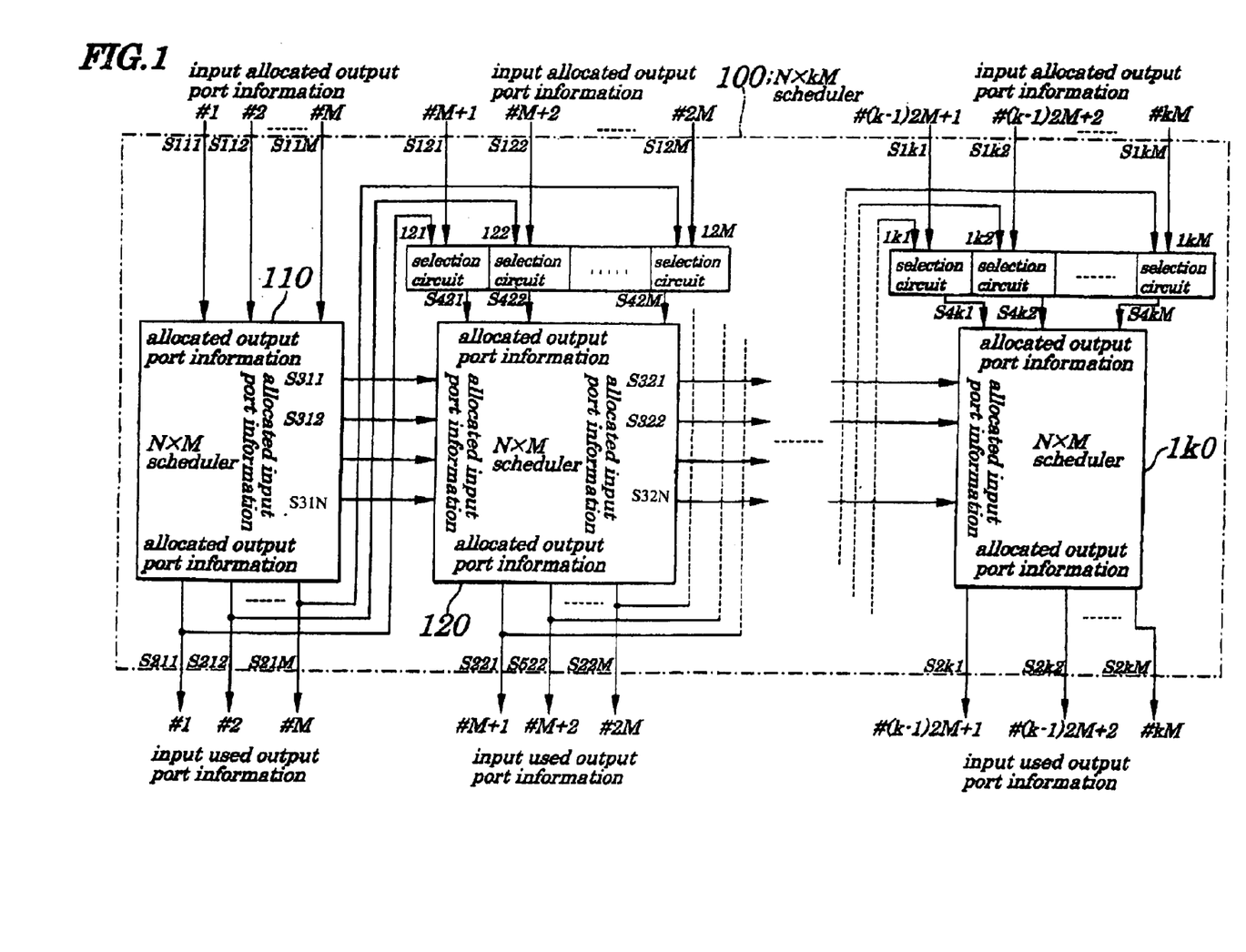
FIG. 1 is a block diagram showing a configuration of a multi-mode scheduler according to a first embodiment of the present invention.

FIG. 1 is a block diagram showing a configuration of a multi-mode scheduler according to a first embodiment of the present invention. In FIG. 1, since the present invention is an invention concerning connection of allocated output port information, a connection allocation request input to the multi-mode scheduler via an input interface and a connection allocation result are not shown.

In FIG. 1, an N×kM scheduler 100 is provided with N×M scheduler 110 to N×M scheduler 1k0 and group of selection circuit 121 to selection circuit 12M to group of selection circuit 1k1 to selection circuit 1kM.

Selection circuit 121 to selection circuit 12M switch allocated output port information S121 to allocated output port information S12M and allocated output port information S211 to allocated output port information S21M output from the N×M scheduler 110 at a front step and output allocated output port information S421 to allocated output port information S42M to an N×M scheduler 120. Also, the selection circuit 1k1 to selection circuit 1kM switch allocated output port information S1k1 to allocated output port information S1kM and allocated output port information S2(k−1)1 to allocated output port information S2(k−1)M output from a N×M scheduler 1(k−1)0 (not shown) at a front step and output allocated output port information S4k1 to allocated output port information S4kM to the N×M scheduler 1k0.

Allocated input port information S311 to allocated input port information S31N output from the N×M scheduler 110 is input to the N×M scheduler 120 at a rear step as the allocated input port information S311 to the allocated input port information S31N. Allocated input port information S321 to allocated input port information S32N output from the N×M scheduler 120 is input to a N×M scheduler (not shown) at a rear step as the allocated input port information S321 to the allocated input port information S32N. Also, allocated input port information S3(k−1)1 to allocated input port information S3(k−1)N output from a N×M scheduler 1(k−1)0 (not shown) is input to the N×M scheduler 1k0 at a rear step as the allocated input port information S3(k−1)1 to the allocated input port information S3(k−1)N.

All of the selection circuit 121 to the selection circuit 12M select either allocated output port information C input from an outside or the allocated output port information output from the N×M scheduler 110 at the front step based on a selection control signal set from an external unit (not shown). Also, all of the selection circuit 1k1 to the selection circuit 1kM select either allocated output port information or the allocated output port information output from the N×M scheduler 1(k−1)0 (not shown) at the front step based on a selection control signal set from an external unit (not shown). When the allocated output port information input from an outside is selected, all of a group of the selection circuit 121 to the selection circuit 12M to a group of the selection circuit 1k1 to the selection circuit 1kM select the allocated output port information input from an outside.

Second Embodiment

Figure 2:
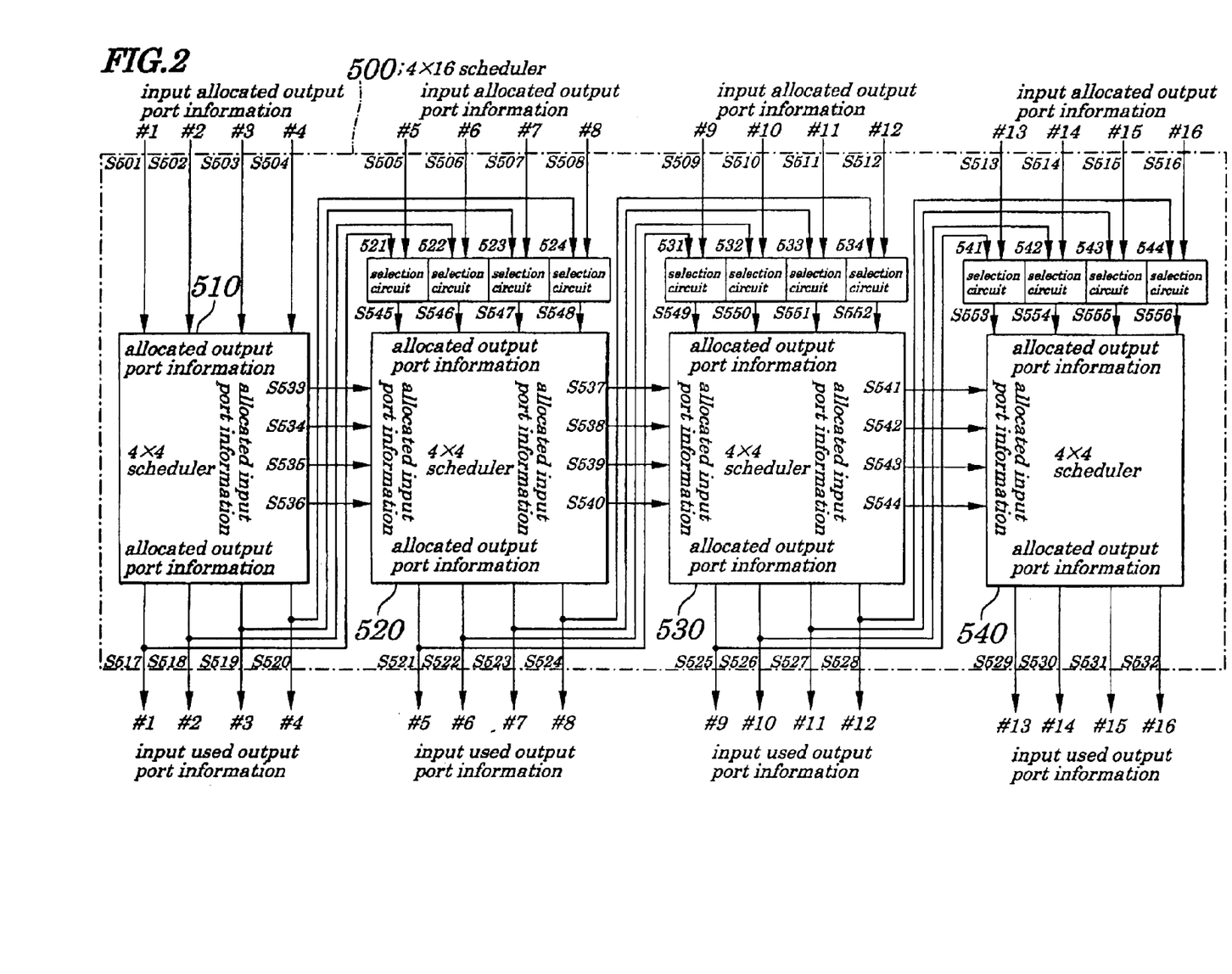
FIG. 2 is a block diagram showing a configuration of a multi-mode scheduler according to a second embodiment of the present invention.

Next, a second embodiment of the present information will be explained with reference to drawings. FIG. 2 is a block diagram showing a configuration of a multi-mode scheduler according to the second embodiment of the present invention. In FIG. 2, the multi-mode scheduler is configured, where N=4, M=4 and k=4. Also, since the present invention is an invention concerning connection of allocated output port information, a connection allocation request input to the multi-mode scheduler via an input interface and a connection allocation result are not shown.

A 4×16 scheduler 500 is provided with a first 4×4 scheduler 510, a second 4×4 scheduler 520, a third 4×4 scheduler 530, a fourth 4×4 scheduler 540, selection circuit 521 to selection circuit 524, selection circuit 531 to selection circuit 534 and selection circuit 541 to selection circuit 544.

Selection circuit 521 to selection circuit 524 select either allocated output port information S505 to allocated output port information S508 which are input from an outside or allocated output port information S517 to allocated output port information S520 which are output from the first 4×4 scheduler 510 and output selected information as allocated output port information S545 to allocated output port information S548 for the second 4×4 scheduler 520.

Selection circuit 531 to selection circuit 534 select either allocated output port information S509 to allocated output port information S512 which are input from an outside or allocated output port information S521 to allocated output port information S524 which are output from the second 4×4 scheduler 520 and output selected information as allocated output port information S549 to allocated output port information S552 for the third 4×4 scheduler 530.

Selection circuit 541 to selection circuit 544 select either allocated output port information S513 to allocated output port information S516 which are input from an outside or allocated output port information S525 to allocated output port information S528 which are output from the third 4×4 scheduler 530 and output selected information as allocated output port information S553 to allocated output port information S556 for the fourth 4×4 scheduler 540.

Allocated input port information S533 to allocated input port information S536 which are output from the first 4×4 scheduler 510 are input to the second 4×4 scheduler 520, allocated input port information S537 to allocated input port information S540 are input to the third 4×4 scheduler 530 and allocated input port information S541 to allocated input port information S544 are input to the fourth 4×4 scheduler 540.

All of selection circuit 521 to selection circuit 524, selection circuit 531 to selection circuit 534 and selection circuit 541 to selection circuit 544 select either allocated output port information which are input from an outside or allocated output port information output from a 4×4 scheduler at a front step based on a selection control signal set by an external unit. When the allocated output port information which are input from an outside is selected, all of selection circuit 521 to selection circuit 524, selection circuit 531 to selection circuit 534 and selection circuit 541 to selection circuit 544 select the allocated output port information input from an outside.

Figure 3:
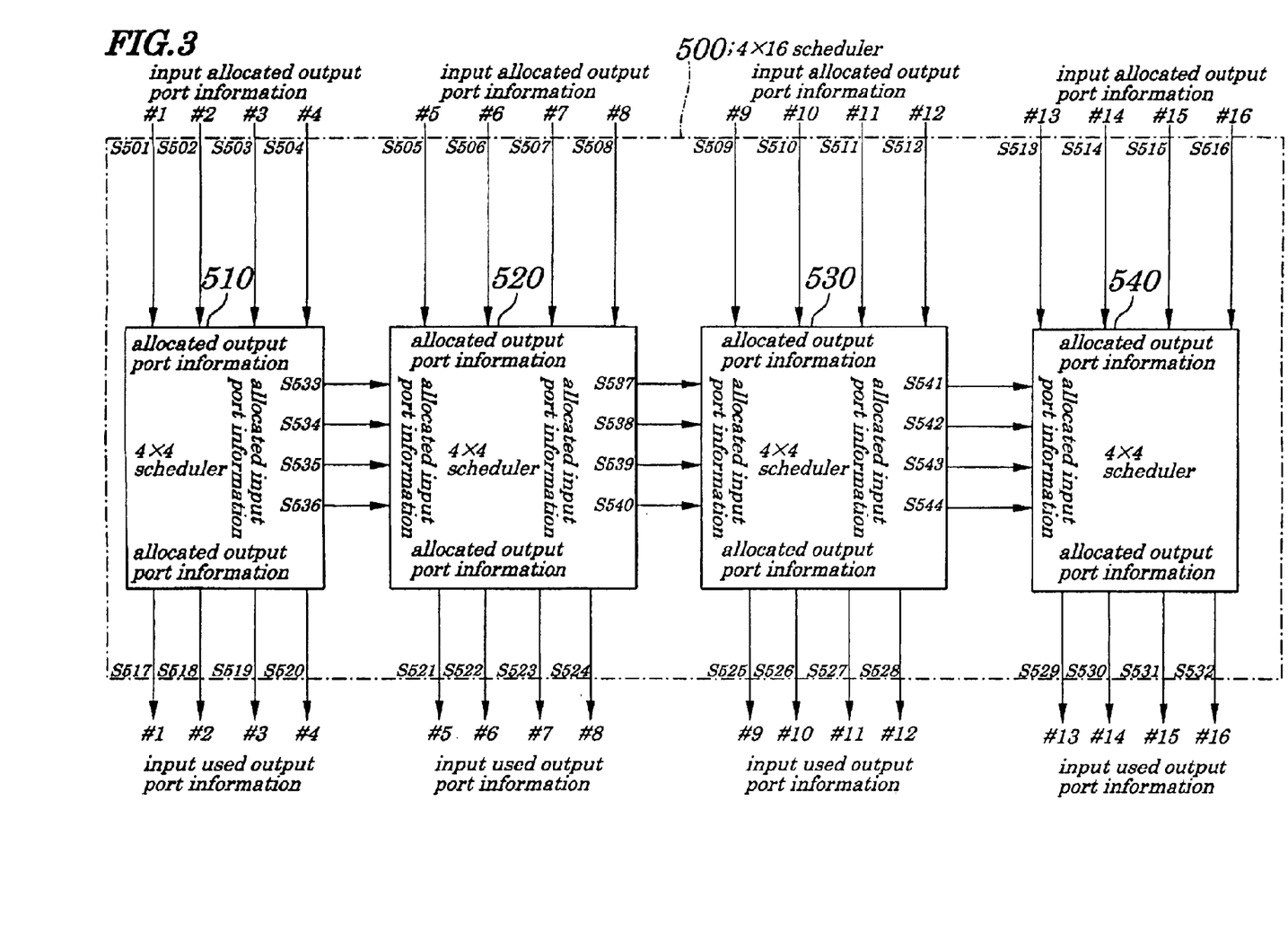
FIG. 3 is a block diagram showing a logical configuration in a first operation mode according to the second embodiment of the present invention.

FIG. 3 is a block diagram showing a logical configuration of a first operation mode according to the second embodiment of the present invention. FIG. 3 shows a logical configuration when selection circuit 521 to selection circuit 524, selection circuit 531 to selection circuit 534 and selection circuit 541 to selection circuit 544 select allocated output port information which are input from an outside as the first operation mode according to the second embodiment of the present invention.

In the first operation mode, the first 4×4 scheduler 510 executes connection allocation for connection allocation requests to output port #1 to output port #4, the second 4×4 scheduler 520 executes connection allocation for connection allocation requests to output port #5 to output port #8, the third 4×4 scheduler 530 executes connection allocation for connection allocation requests to output port #9 to output port #12 and the fourth 4×4 scheduler 540 executes connection allocation for connection allocation requests to output port #13 to output port #16.

The first 4×4 scheduler 510 refers to allocated output port information S501 to allocated output information S504 which are input from an outside and executes connection allocation to a non-allocated output port. The first 4×4 scheduler 510 causes a connection allocation result to reflect in allocated output port information S501 to allocated output port information S504 which are input from an outside, generates new allocated output port information S517 to new allocated output port information S520 so as to be output to an external unit (not shown) and outputs connection-allocated input port information to the second 4×4 scheduler 520 as allocated input port information S533 to allocated input port information S536.

The second 4×4 scheduler 520 refers to allocated output port information S505 to allocated output information S508 input from an outside and to allocated input port information S533 to allocated input port information S536 input from the first 4×4 scheduler 510 and executes connection allocation to non-allocated input port and output port.

The second 4×4 scheduler 520 causes a connection allocation result to reflect in allocated output port information S505 to allocated output port information S508 input from an outside and allocated input port information S533 to allocated input port information S536 input from the first 4×4 scheduler 510, generates new allocated output port information S521 to new allocated output port information S524 so as to be output to an external unit (not shown) and outputs connection-allocated input port information to the third 4×4 scheduler 530 as allocated input port information S537 to allocated input port information S540.

The third 4×4 scheduler 530 refers to allocated output port information S509 to allocated output information S512 input from an outside and to allocated input port information S537 to allocated input port information S540 input from the second 4×4 scheduler 520 and executes connection allocation to non-allocated input port and output port.

The third 4×4 scheduler 530 causes a connection allocation result to reflect in allocated output port information S509 to allocated output port information S512 input from an outside and allocated input port information S537 to allocated input port information S540 input from the second 4×4 scheduler 520, generates new allocated output port information S525 to new allocated output port information S528 so as to be output to an external unit (not shown) and outputs connection-allocated input port information to the fourth 4×4 scheduler 540 as allocated input port information S541 to allocated input port information S544.

The fourth 4×4 scheduler 540 refers to allocated output port information S513 to allocated output information S516 input from an outside and to allocated input port information S541 to allocated input port information S544 input from the third 4×4 scheduler 530 and executes connection allocation to non-allocated input port and output port.

The fourth 4×4 scheduler 540 causes a connection allocation result to reflect in allocated output port information S513 to allocated output port information S516 which are input from an outside and generates new allocated output port information S529 to new allocated output port information S532 so as to be output to an external unit (not shown).

Figure 4:
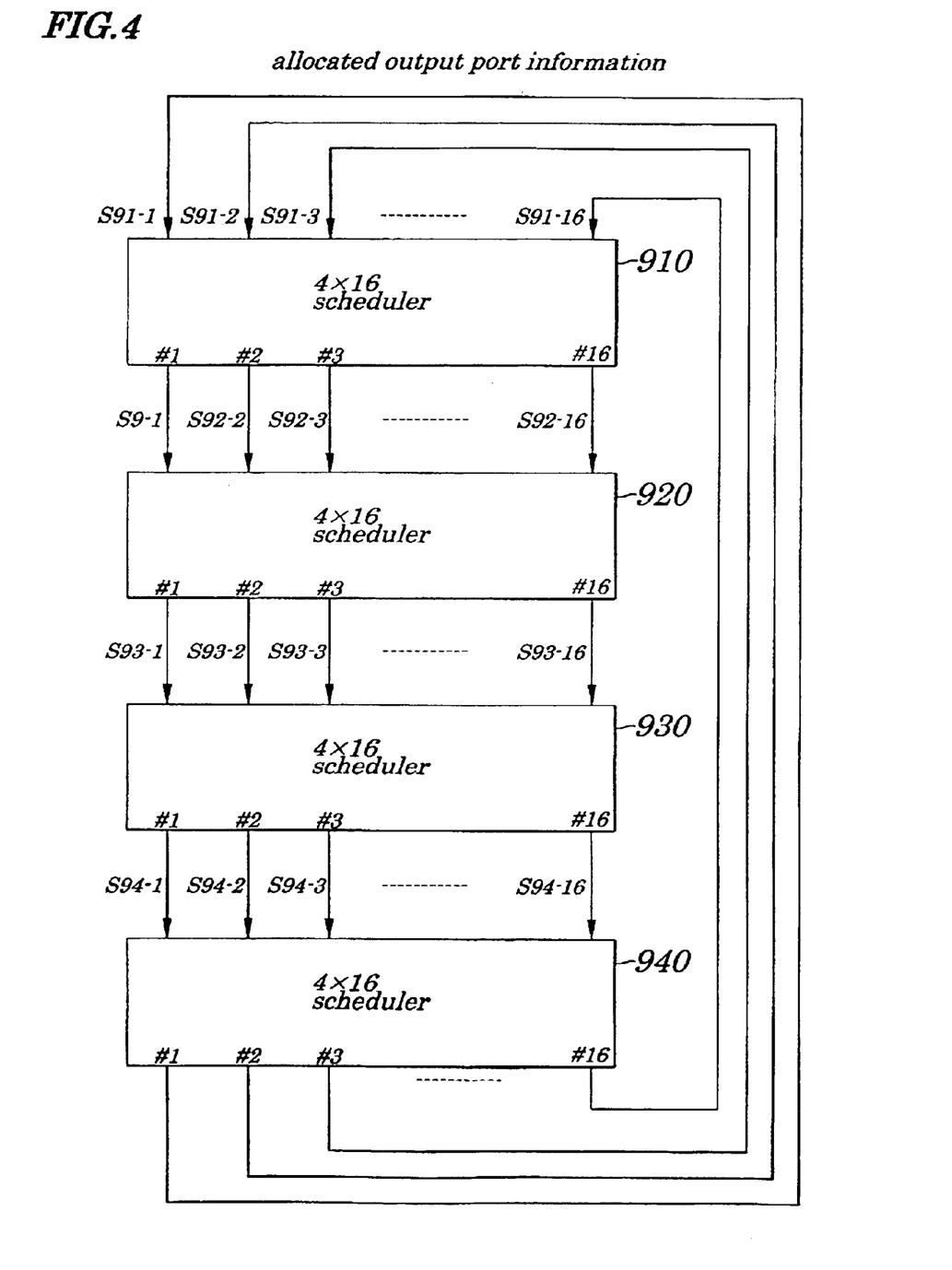
FIG. 4 is a block diagram showing a logical configuration in enlarging a number of ports in the first operation mode according to the second embodiment of the present invention.

FIG. 4 is a block diagram showing a logical configuration in enlarging a number of ports in the first operation mode according to the second embodiment of the present invention. FIG. 4 shows a logical configuration when a number of ports is enlarged in the first operation mode. Additionally, in FIG. 4, scheduler 910 to scheduler 940 correspond to the 4×16 scheduler 500 shown in FIG. 3.

The scheduler 910 executes connection allocation for connection allocation requests from input port #1 to input port #4, the scheduler 920 executes connection allocation for connection allocation requests from input port #5 to input port #8, the scheduler 930 executes connection allocation for connection allocation requests from input port #9 to input port #12 and the scheduler 940 executes connection allocation for connection allocation requests from input port #13 to input port #16.

In the second embodiment, scheduler 910 to scheduler 940 execute processes in pipeline connection in order to enlarge the number of ports and execute parallel processes in order not to deteriorate switch transmission performance.

Figure 5:
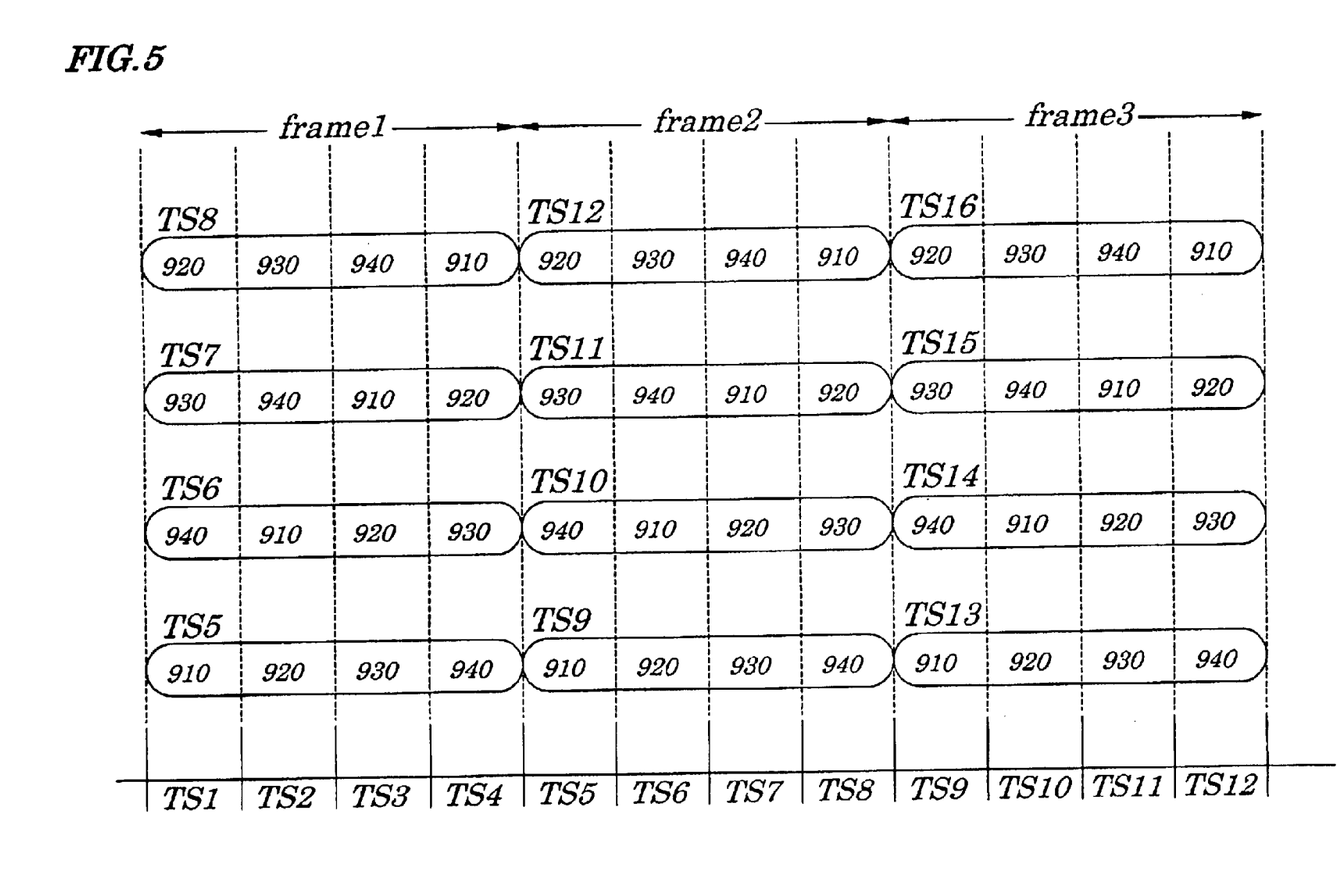
FIG. 5 is a view showing an operation of each scheduler in FIG. 4.

FIG. 5 is a view showing operations of scheduler 910 to scheduler 940. FIG. 5 shows an operation of Framed-RRGS (Framed Round Robin Greedy Scheduling). The operation in enlarging the number of ports in the first operation mode according to the second embodiment will be explained with reference to FIG. 4 and FIG. 5.

An enlargement configuration in FIG. 4 shows a technique for making up a 16×16 scheduler by pipeline-connecting four 4×16 schedulers. In this case, a time used for 4×16 scheduling in each scheduler 910 to scheduler 940 is defined as one time slot (TS).

One TS, in a communication apparatus which is provided with a switch section (not shown) including scheduler 910 to scheduler 940 and a cross point switch (not shown), a plurality of input interface sections (not shown) and a plurality of output interface sections (not shown), is equal to a time for transmitting data from the input interface section to the output interface section via the cross point switch or shorter.

In FIG. 5, scheduling for transmitting data to TS5 is firstly executed by the scheduler 910 in TS1, and sequentially executed by the scheduler 920 in TS2, by the scheduler 930 in TS3 and by the scheduler 940 in TS4.

Similarly, scheduling for transmitting data to TS6 is firstly executed by the scheduler 940 in TS1, and sequentially executed by the scheduler 910 in TS2, by the scheduler 920 in TS3 and by the scheduler 930 in TS4. Similarly, another scheduling is executed.

In TS1, the scheduler 910 executes scheduling for TS5, the scheduler 920 executes scheduling for TS8, the scheduler 930 executes scheduling for TS7 and the scheduler 940 executes scheduling for TS6.

Also, in another time slot, similar scheduling for time slots of respective schedulers is executed in parallel. By taking four TSs, scheduling of data to be transited to four TSs in a next frame, and therefore, it is possible to obtain an equivalent performance in which scheduling of data transmission once is executed in one TS.

The operation of Framed-RRGS is an example, and an algorithm of RRGS is also available. The operation is discussed in, for example, Electronic Communication Society Technical Research Report (SSE99-121, Dec. 16, 1999).

When a 4×4 scheduler is made up as described above, a 4×16 scheduler is used and only connection allocation requests for output port #1 to output port #4 are input. As its reasons, no connection allocation is executed when no connection allocation request for output port #5 to output port #16 is input.

When a 8×8 scheduler is made up, two 4×16 schedulers are pipeline-connected and only connection allocation requests for output port #1 to output port #8 are input. Similarly, when a 12×12 scheduler is made up, three 4×16 schedulers are pipeline-connected.

Figure 9:
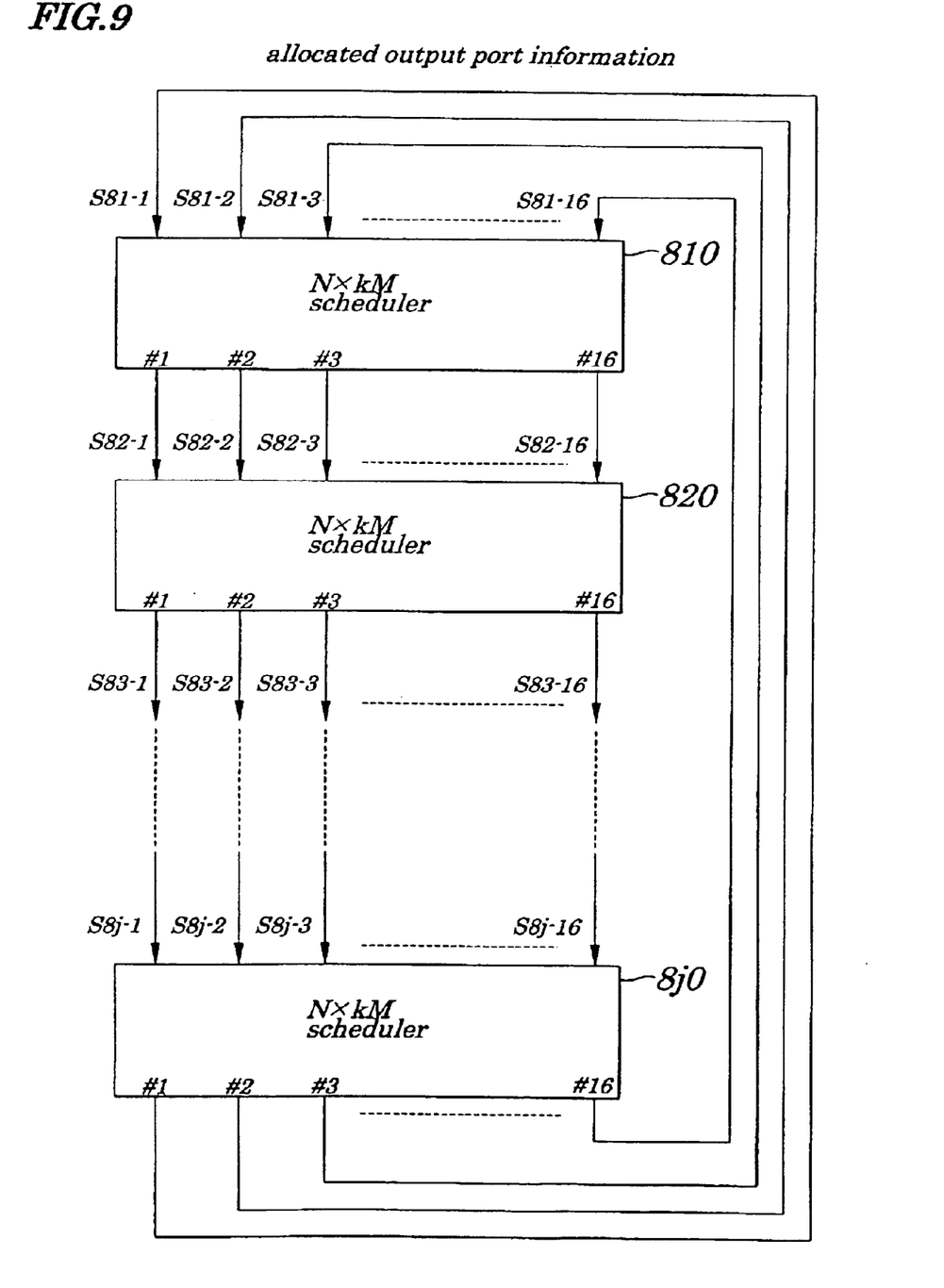
FIG. 9 is a block diagram showing a generalized logic configuration when a number of ports is increased in a first operation mode according to the first embodiment of the present invention.

When a 20×16 scheduler is made up, five 4×16 schedulers are pipeline-connected. In this way, j pieces of N×kM schedulers are pipeline-connected (where j is an integer not less than two), and thereby a jN×kM scheduler can be made. FIG. 9 shows a generalized configuration of the configuration shown in FIG. 4 and is a block diagram showing a generalized logic configuration when a number of ports is increased in the first operation mode. Scheduler 810 to scheduler 8j0 correspond to the scheduler 100 shown in FIG. 1.

Figure 6:
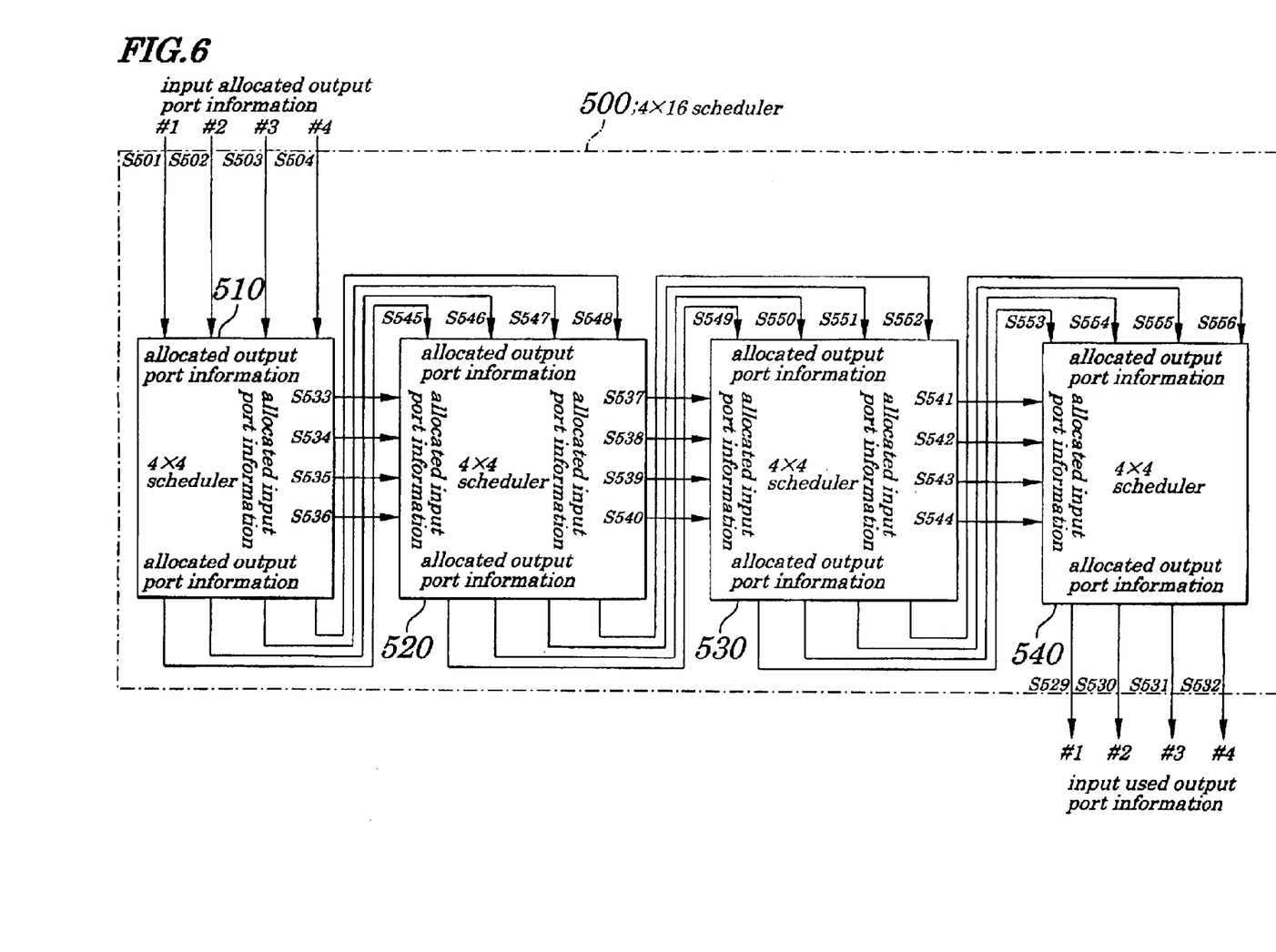
FIG. 6 is a block diagram showing a logical configuration in a second operation mode according to the second embodiment of the present invention.

FIG. 6 is a block diagram showing a logical configuration in a second operation mode according to the second embodiment of the present invention. FIG. 6 shows a logical configuration when selection circuit 521 to selection circuit 524, selection circuit 531 to selection circuit 534 and selection circuit 541 to selection circuit 544 select allocated output port information from the scheduler at a front step in the second operation mode according to the second embodiment of the present invention.

Since the first 4×4 scheduler 510 is a scheduler at a first step, "0 (zero)" must be input to allocated output port information to be input. Therefore, selection circuits may be provided for allocated output port information input to the first 4×4 scheduler 510 similarly to second 4×4 scheduler 520 to fourth 4×4 scheduler 540 and "0 (zero)" maybe given fixedly to the first 4×4 scheduler 510 in the 4×16 scheduler 500.

Each of first 4×4 scheduler 510 to fourth 4×4 scheduler 540 executes connection allocation for output port #1 to output port #4, however, respective schedulers deal with respective priority classes.

The first 4×4 scheduler 510 executes connection allocation for a connection allocation request of a first priority, the second 4×4 scheduler 520 executes connection allocation for a connection allocation request of a second priority, the third 4×4 scheduler 530 executes connection allocation for a connection allocation request of a third priority and the fourth 4×4 scheduler 540 executes connection allocation for a connection allocation request of a fourth priority.

The first 4×4 scheduler 510 refers to allocated output port information S501 to allocated output information S504 which are input from an outside and executes connection allocation to a non-allocated output port. The first 4×4 scheduler 510 causes a connection allocation result to reflect in allocated output port information S501 to allocated output port information S504 which are input from an outside, generates new allocated output port information S545 to new allocated output port information S548 so as to be output to an external unit (not shown) and outputs connection-allocated input port information to the second 4×4 scheduler 520 as allocated input port information S533 to allocated input port information S536.

The second 4×4 scheduler 520 refers to allocated input output port information S545 to allocated output port information S548 and allocated input port information S533 to allocated input port information S536 input from the first 4×4 scheduler 510 and executes connection allocation to non-allocated input port and output port. The second 4×4 scheduler 520 causes a connection allocation result to reflect in allocated output port information S545 to allocated output port information S548 input from an outside and allocated input port information S533 to allocated input port information S536 input from the first 4×4 scheduler 510, generates new allocated output port information S549 to new allocated output port information S552 so as to be output and outputs connection-allocated input port information to the third 4×4 scheduler 530 as allocated input port information S537 to allocated input port information S540.

The third 4×4 scheduler 530 refers to allocated output port information S549 to allocated output port information S552 and allocated input port information S537 to allocated input port information S540 input from the second 4×4 scheduler 520 and executes connection allocation to non-allocated input port and output port. The third 4×4 scheduler 530 causes a connection allocation result to reflect in allocated output port information S549 to allocated output port information S552 input from an outside and allocated input port information S537 to allocated input port information S540 input from the second 4×4 scheduler 520, generates new allocated output port information S553 to new allocated output port information S556 so as to be output and outputs connection-allocated input port information to the fourth 4×4 scheduler 540 as allocated input port information S541 to allocated input port information S544.

The fourth 4×4 scheduler 540 refers to allocated output port information S553 to allocated output port information S556 and allocated input port information S541 to allocated input port information S544 input from the third 4×4 scheduler 530 and executes connection allocation to non-allocated input port and output port. The fourth 4×4 scheduler 540 causes a connection allocation result to reflect in allocated output port information S553 to allocated output port information S556 which are input from an outside and generates new allocated output port information S529 to new allocated output port information S532 so as to be output to an external unit (not shown).

Figure 7:
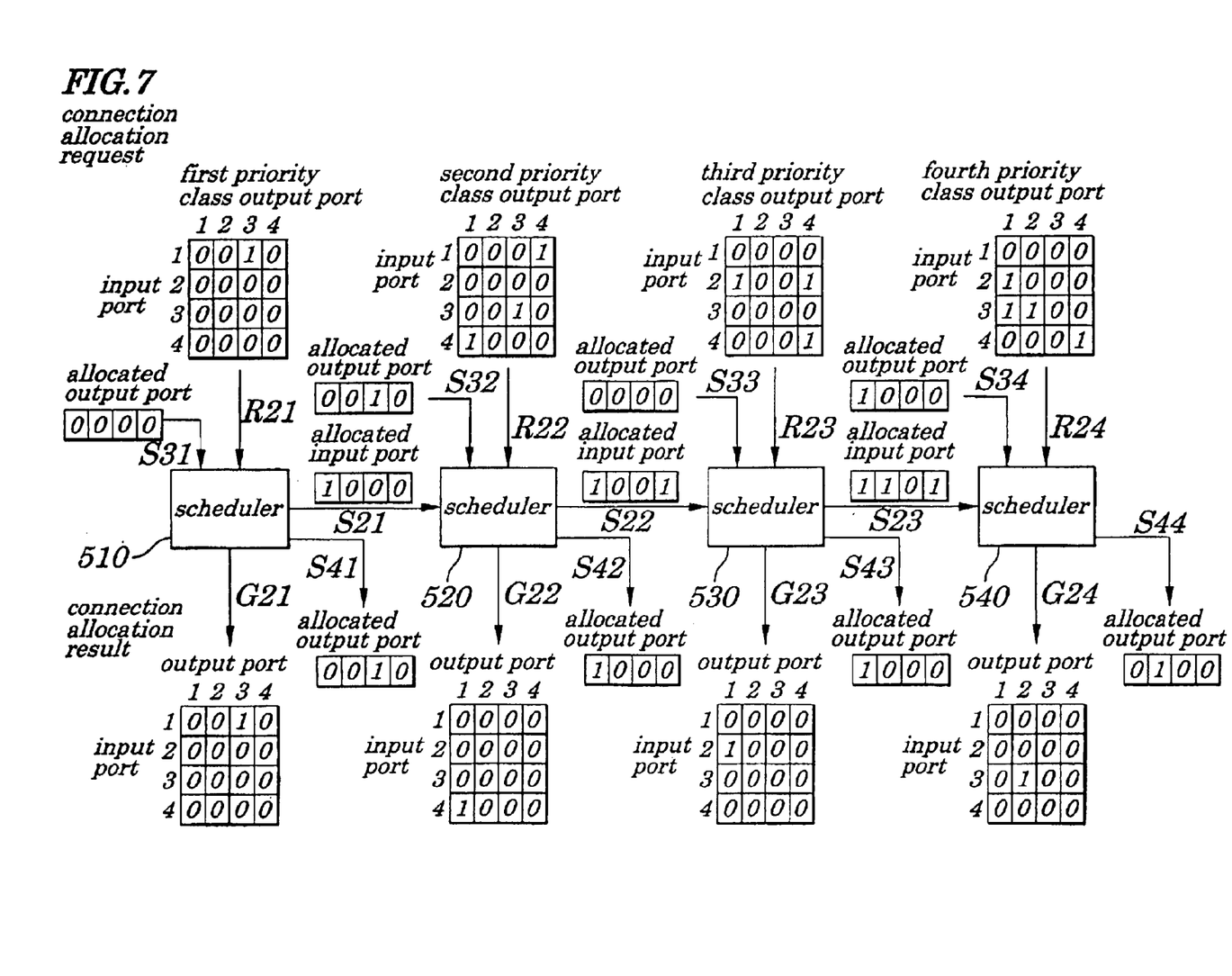
FIG. 7 is a view explaining the first operation mode according to the second embodiment of the present invention.
Figure 8:
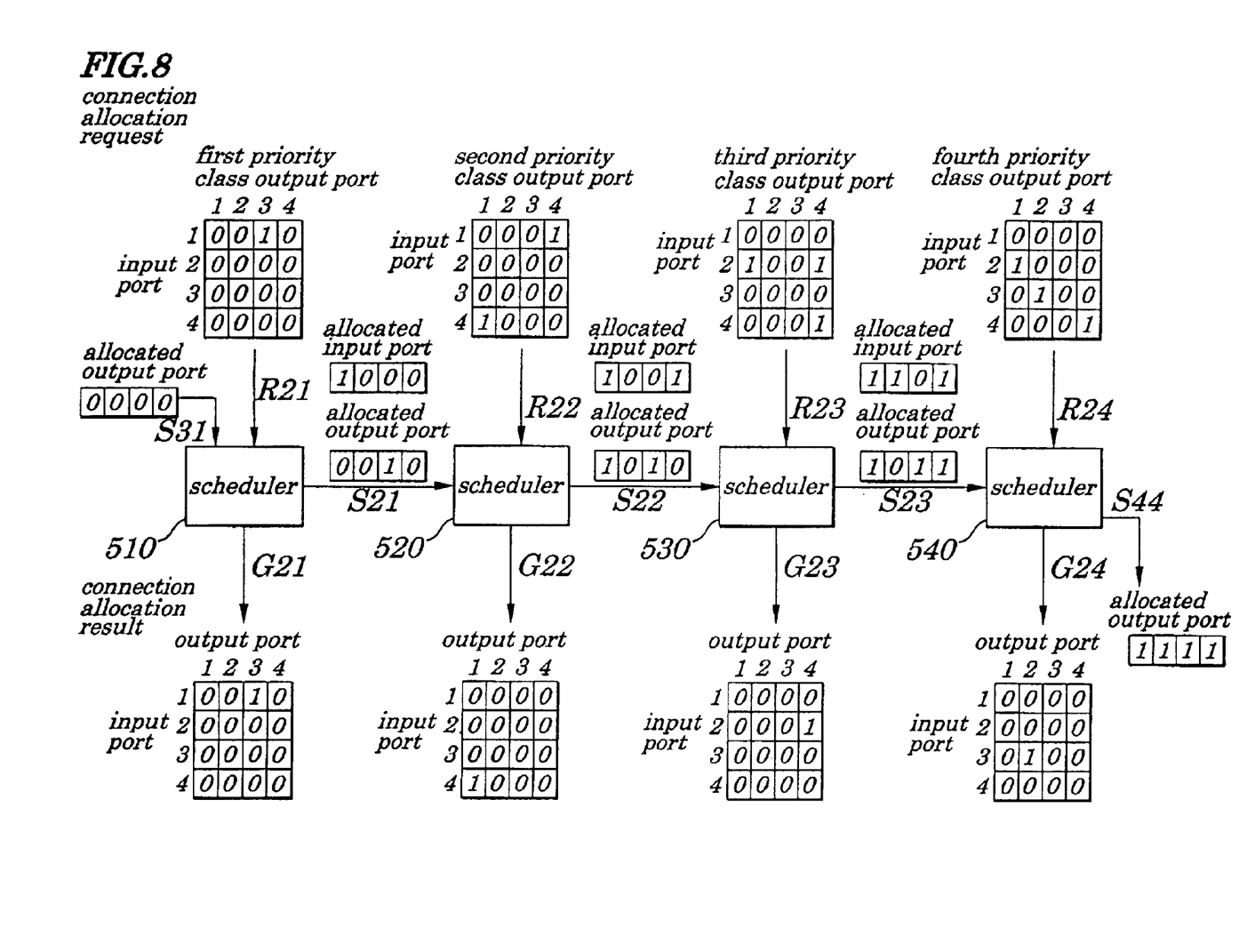
FIG. 8 is a view explaining the second operation mode according to the second embodiment of the present invention.

FIG. 7 is a view explaining an operation in the first operation mode according to the second embodiment of the present invention. FIG. 8 is a view explaining an operation in the second operation mode according to the second embodiment of the present invention. Operations in the first operation mode and in the second operation mode will explained with reference to FIG. 7 and FIG. 8.

In FIG. 7, a connection allocation request input to a scheduler of which the number of input ports is four and the number of output ports is sixteen is represented by a 4×16 matrix. A vertical axis represents input ports and a horizontal axis represents output ports. When an entry of an input port "s" and of an output port "d" is "1", it means that there is a connection allocation request from the input port "s" to the output port "d". Since each of the first scheduler 510 to the fourth scheduler 540 is a 4×4 scheduler, a 4×16 matrix is divided into four, each of which has four output ports, and a 4×4 connection allocation request matrix is input to each of first 4×4 scheduler 510 to fourth 4×4 scheduler 540.

Also, a connection allocation result matrix is defined similarly, and an entry of "1" represents a pair of an input port and an output port for which collection allocation is executed. Hereafter, it is assumed that (s, d) represents the input port s and the output port d.

In the first 4×4 scheduler 510, since no allocated port exists as both of the input port and the output port, an input connection allocation request R21 is input to the first 4×4 scheduler 510 without being changed and connection allocation G21 is executed. Additionally, any scheduling algorithm is available for the first 4×4 scheduler 510.

Since connection allocation obtained in the first 4×4 scheduler 510 is (1,3), "1" is set to an input port #1 in allocated input port information S21 and "1" is set to an output port #3 in allocated output port information S41, and then allocated input port information S21 and the allocated output port information S41 are output.

The second 4×4 scheduler 520 judges that the input port #1 and the output port #7 are already allocated based on the allocated input port information S21 and allocated output port information S32 which are input, masks corresponding connection allocation requests and allocates remaining connection allocation requests (G22).

In a matrix of the connection allocation request R22 input to the second 4×4 scheduler 520, entries within a bold line frame are connection allocation requests to be masked. Since the connection allocation obtained by the second 4×4 scheduler 520 is (4, 5), this allocation result (4, 5) is reflected over the allocated input port information S21 which is input so that "1" is added to the input port #4 and is output as allocated input port information S22, and then "1" is set to the output port #5 of allocated output port information S42 so as to be output.

The third 4×4 scheduler 530 judges that the input port #1 and the input port #4 are already allocated based on the allocated input port information S22 and the allocated output port information, masks connection allocation requests of corresponding ports and allocates remaining connection allocation requests (G23).

In a matrix of a connection allocation request R23 input to the third 4×4 scheduler 530, entries within bold line frames are connection allocation requests to be masked. Since the connection allocation obtained by the third 4×4 scheduler 530 is (2,9), this allocation result (2,9) is reflected over the allocated input port information S22 which is input so that "1" is added to the input port #2 and is output as allocated input port information S23, and then "1" is set to the output port #9 of allocated output port information S42 so as to be output.

The fourth 4×4 scheduler 510 judges that the input port #1, the input port #2 and the input port #4 are already allocated based on the allocated input port information S23 and the allocated output port information S34, masks connection allocation requests of corresponding ports and allocates remaining connection allocation requests (G24).

In a matrix of a connection allocation request R24 input to the fourth 4×4 scheduler 510, entries within a bold line frame are connection allocation requests to be masked. Since the connection allocation obtained by the fourth 4×4 scheduler 510 is (3,14), "1" is added to the input port #5 of the allocated output port information S42 and is output. Additionally, since the fourth 4×4 scheduler 510 is a final step, no allocated input port information is output.

In FIG. 8, there are four service classes of which priorities are different, and a connection allocation request of each priority class is represented by a 4×4 matrix. Definition of the connection allocation request and the connection allocation result is similar to those of the first operation mode. A first (highest) priority class connection allocation request, a second priority class connection allocation request, a third priority class connection allocation request and a fourth (lowest) priority class connection allocation request are respectively input to the first 4×4 first 4×4 scheduler 510, the second 4×4 scheduler 520, the third 4×4 scheduler 530 and the fourth 4×4 scheduler 510.

Since there is no scheduler of a higher priority than the first 4×4 scheduler 510, "0" is input to all the allocated output port information S31 input to the first 4×4 scheduler 510. In the first 4×4 scheduler 510, since there is no allocated input port and no allocated output port, the input connection allocation request R21 is input to the first 4×4 scheduler 510 without changing and connection allocation indicated by G21 is executed.

Since the connection allocation obtained by the first 4×4 scheduler 510 is (1,3), "1" is set to the input port #1 of the allocated input port information S21 and "1" is set to the output port #3 of the allocated output port information S41, and then the allocated input port information S21 and the allocated output port information S41 are output.

The second 4×4 scheduler 520 judges that the input port #1 and the output port #7 are already allocated based on the allocated input port information S21 and allocated output port information S42 which are input, masks connection allocation requests of corresponding ports and allocates remaining connection allocation requests (G22).

In a matrix of the connection allocation request R22 input to the second 4×4 scheduler 520, entries within a bold line frame are connection allocation requests to be masked. Since the connection allocation obtained by the second 4×4 scheduler 520 is (4,1), this allocation result (4,1) is reflected over the allocated input port information S21 which is input so that "1" is added to the input port #4 and is output as allocated input port information S22, and then "1" is set to the output port #1 of allocated output port information S42 so as to be output.

The third 4×4 scheduler 530 judges that the input port #1 and the input port #4 are already allocated based on the allocated input port information S22 and the allocated output port information S42, masks connection allocation requests of corresponding ports and allocates remaining connection allocation requests (G23).

In a matrix of a connection allocation request R23 input to the third 4×4 scheduler 530, entries within a bold line frame are connection allocation requests to be masked. Since the connection allocation obtained by the third 4×4 scheduler 530 is (2,4), this allocation result (2,4) is reflected over the allocated input port information S22 which is input so that "1" is added to the input port #2 and is output as allocated input port information S23, and also this allocation result (2,4) is reflected over the allocated output port information S42 which is input so that "1" is added to the input port #4 and is output as allocated input port information S43.

The fourth 4×4 scheduler 510 judges that the input port #1, the input port #2 and the input port #4 and the output port #1, the output port #3 and the output port #4 are already allocated based on the allocated input port information S23 and the allocated output port information S34, masks connection allocation requests of corresponding ports and allocates remaining connection allocation requests (G24).

In a matrix of a connection allocation request R24 input to the fourth 4×4 scheduler 510, entries within a bold line frame are connection allocation requests to be masked. Since the connection allocation obtained by the fourth 4×4 scheduler 510 is (3,2), "1" is added to the input port #2 of the allocated output port information S44 and is output. Additionally, since the fourth 4×4 scheduler 510 is a final step, no allocated input port information is output.

Since the first 4×4 scheduler 510 executes connection allocation firstly, the connection allocation request of the first (highest) priority class is allocated with priority regardless of a state of connection allocation requests of the second priority class or more.

Then, a connection allocation request of the second priority class is allocated after connection allocation of the first priority class, and therefore, when there is a connection allocation request to a same port in the first priority class and in the second priority class, the connection allocation request of the second priority class can not be allocated to the same port. However, the connection allocation request of the second priority class can be allocated to non-allocated port after allocation of the first priority class prior to the third priority class and the fourth (lowest) priority class. In this way, since connection allocation is executed in order of priority, an allocation chance increases as a priority class becomes higher.

As described above, selection circuits are controlled so that the allocated output port information input from an external unit (not shown) is input to each of first 4×4 scheduler 510 to the second 4×4 scheduler 520, and thereby it is possible to produce a scheduler having extendibility of a number of ports. Selection circuits are controlled so that allocated output port information output from a front step scheduler is input to a next step scheduler, and thereby it is possible to produce a scheduler capable of dealing with a plurality of priorities.

Further, in the first operation mode (FIG. 3), allocation is executed to output port #1 to output port #4 with priority rather than other output ports. Then, a scheduler disclosed in Japanese Patent Application No. Hei 11-282358 (not published) is combined with the scheduler of the present invention, and thereby it is possible to keep impartiality among respective 4×4 schedulers making up a 4×16 scheduler.

In other words, in FIG. 3, in the 4×16 scheduler including first 4×4 scheduler 510 to fourth 4×4 scheduler 540, at any time, the first 4×4 scheduler 510 executes scheduling for output port #1 to output port #4, the second 4×4 scheduler 520 executes scheduling for output port #5 to output port #8, the third 4×4 scheduler 530 executes scheduling for output port #9 to output port #12 and the fourth 4×4 scheduler 540 executes scheduling for output port #13 to output port #16. As a result, an allocation opportunity among ports is partial since connection allocation requests to output port #1 to output port #4 are executed with the highest priority.

In order to solve the partiality, "group shuffle" proposed in the scheduler disclosed in Japanese Patent Application No. Hei 11-282358 is effective. The group shuffle is a technique in which ports dealt by each of first 4×4 scheduler 510 to the fourth 4×4 scheduler 540 are made into a group and changed for each frame shown in FIG. 5. With this change, priority of output ports to be processed becomes different for each frame, and therefore it is possible to make the allocation opportunity impartial.

Impartiality among four input ports or four output ports in each of the first 4×4 scheduler 510 to the fourth 4×4 scheduler 540 depends on algorithm used in first 4×4 scheduler 510 to the fourth 4×4 scheduler 540.

When used algorithm keeps impartiality among ports, there is no problem. However, when used algorithm does not keep impartiality, change is executed among input ports and output ports in each of the first 4×4 scheduler 510 to the fourth 4×4 scheduler 540 and thereby it is possible to keep the allocation opportunity among ports.

Further, in the second operation mode according to the second embodiment of the present invention, the first 4×4 scheduler 510 processes connection allocation requests of the first priority, the second 4×4 scheduler 520 processes connection allocation requests of the second priority, the third 4×4 scheduler 530 processes connection allocation requests of the third priority and the fourth 4×4 scheduler 540 processes connection allocation requests of the fourth priority. In other words, priority control is executed by allocating a connection allocation request from a highest priority in order of priority, and therefore, it is possible to change the order of connection allocation requests dealt by the first 4×4 scheduler 510 to the fourth 4×4 scheduler 540.

In addition, in FIG. 1 to FIG. 4 and FIG. 6, only allocated input port information and allocated output port information are shown, however, a connection allocation request from the input interface section is also input and a connection allocation result is returned to the input interface section. In FIG. 7 and FIG. 8, the connection allocation request and the connection allocation result are shown.

Now, when the pipeline configuration in FIG. 4 is used, by combining "packet switch and packet switching method" disclosed in Japanese Patent Application No. Hei 11-355382 (not published) with the present invention, it is possible to keep impartiality of the connection allocation among schedulers.

In other words, when the enlargement configuration shown in FIG. 4 is used, partiality generates among the plurality of 4×16 schedulers. In FIG. 5, when attention is paid to the scheduler 910 and the scheduler 920, as a scheduling order for a TS, a ratio in that the scheduler 910 executes allocation prior to the scheduler 920 is a ratio of three times to four times, and therefore, a possibility in that a priority is given to connection allocation requests required by input port #1 to input port #4 dealt by the scheduler 910 than a possibility in that a priority is given to connection allocation requests required by input port #5 to input port #8 dealt by the scheduler 920.

Another combination is also similar, however, only a combination of schedulers which are provided at even intervals, such as the scheduler 910 and the scheduler 920 is impartial. This partiality occurs not only between two schedulers but also among three schedulers.

The partiality is caused because a connection order of scheduler 910 to scheduler 940 is fixed. Then, the connection order is changed dynamically, and thereby the partiality is solved.

When a 4×16 scheduler is divided into circuits which are physically different, such as a FPGA (Field Programmable Gate Array) and a ASIC (Application Specific IC), ports can not be changed like the above-mentioned "scheduler". As its causes, a port input is fixed to each circuit by fixed wiring.

Since a connection order is determined by a connection destination of allocated output port information, the connection destination of allocated output port information is changed. Concretely, a 4×4 switch is prepared in addition to FIG. 4. Allocated output port information is not directly transmitted to a next scheduler, but all allocated output port information is transmitted via the 4×4 switch.

The 4×4 switch changes a connection destination for each frame shown in FIG. 5 so as to output the allocated output port information, and thereby changes an allocation processing order among 4×16 scheduler 910 to 4×16 scheduler 940. With this operation, it is possible to keep impartiality among input ports. In other words, the above-mentioned packet switch and packet switching method are used, and thereby it is possible to keep impartiality among 4×16 scheduler 910 to 4×16 scheduler 940.

As described above, N×kM scheduler is provided with k-pieces of blocks (N×M scheduler), as allocated output port information to be input to each N×M scheduler, information input from an outside of the N×kM scheduler and information from the N×M scheduler at a front step are changed, and thereby it is possible to deal with both of a router in which extendibility in the number of ports is required and a router in which priority control is required among a plurality of classes. Further, it is possible to produce a general scheduler.

It is thus apparent that the present invention is not limited to the above embodiments but may be changed and modified without departing from the scope and spirit of the invention.

What is claimed is:

1. A multi-mode scheduler including a N×kM scheduler for adjusting data transmission between N-pieces of input interface sections, where N is a positive integer, and kM-pieces of output interface sections, where said M is a positive integer and said k is an integer not less than two, said multi-mode scheduler comprising:

k-pieces of N×M schedulers to be said N×kM scheduler; and (k−1)-pieces of selection circuits for switching allocated output port information input from an outside of said N×kM scheduler and information from one of said N×M schedulers at a front step so as to be input to another one of said N×M schedulers as allocated output port information;

wherein an operation of said N×kM scheduler or an operation of said N×M schedulers having k-pieces of priority classes is set freely with switching operation of said (k−1)-pieces of selection circuits.

2. The multi-mode scheduler according to claim 1, wherein j-pieces of said N×kM scheduler, where j is an integer not less than two, are connected so as to make up a jN×kM scheduler when said allocated output port information input from said outside is used.

3. The multi-mode scheduler according to claim 2, wherein each of said (k−1)-pieces of selection circuits selects said allocated output port information input from said outside when said allocated output port information input from said outside is used.

4. The multi-mode scheduler according to claim 2, wherein j-pieces of said N×kM scheduler are pipeline-connected so as to make up said jN×kM scheduler.

5. The multi-mode scheduler according to claim 1, wherein said N×kM scheduler is used alone so as to make up said N×M schedulers having k-pieces of priority classes when information from said N×M scheduler at said front step is used.

6. The multi-mode scheduler according to claim 5, wherein each of said (k−1)-pieces of selection circuits selects information from one of said N x kM schedulers at said front step when said N×M scheduler is used alone.

7. The multi-mode scheduler according to claim 1, wherein each of said N-pieces of input interface sections includes a virtual output queue buffer for storing reception data for each output interface section to be a destination.

8. A multi-mode scheduler including a N×kM scheduler for adjusting data transmission between N-pieces of input interface means, where N is a positive integer, and kM-pieces of output interface means, where said M is a positive integer and said k is an integer not less than two, said multi-mode scheduler comprising:

k-pieces of N×M schedulers to be said N×kM scheduler; and (k−1)-pieces of selection means for switching allocated output port information input from an outside of said N×kM scheduler and information from one of said N×M schedulers at a front step so as to be input to another one of said N×M schedulers as allocated output port information;

wherein an operation of said N×kM scheduler or an operation of said N×M schedulers having k-pieces of priority classes is set freely with switching operation of said (k−1)-pieces of selection means.

9. The multi-mode scheduler according to claim 8, wherein j-pieces of said N×kM scheduler, where j is an integer not less than two, are connected so as to make up a jN×M scheduler when said allocated output port information input from said outside is used.

10. The multi-mode scheduler according to claim 9, wherein each of said (k−1)-pieces of selection means selects said allocated output port information input from said outside when said allocated output port information input from said outside is used.

11. The multi-mode scheduler according to claim 9, wherein j-pieces of said N×kM scheduler are pipeline-connected so as to make up said jN×M scheduler.

12. The multi-mode scheduler according to claim 8, wherein said N×kM scheduler is used alone so as to make up said N×M schedulers having k-pieces of priority classes when information from said N×M scheduler at said front step is used.

13. The multi-mode scheduler according to claim 12, wherein each of said (k−1)-pieces of selection means selects information from one of said N×M schedulers at said front step when said N×kM scheduler is used alone.

14. The multi-mode scheduler according to claim 8, wherein each of said N-pieces of input interface means includes a virtual output queue buffer for storing reception data for each output interface means to be a destination.

15. An apparatus including a multi-mode scheduler including a N×kM scheduler for adjusting data transmission between N-pieces of input interface sections, where N is a positive integer, and kM-pieces of output interface sections, where M is a positive integer and k is an integer not less than two, comprising:

k-pieces of N×M schedulers to be said N×kM scheduler; and (k−1)-pieces of selection circuits for switching allocated output port information input from an outside of said N×kM scheduler and information from one of said N×M schedulers at a front step so as to be input to another one of said N×M schedulers as allocated output port information;

wherein an operation of said N×kM scheduler or an operation of said N×M schedulers having k-pieces of priority classes is set freely with switching operation of said (k−1)-pieces of selection circuits.

16. An apparatus including a multi-mode scheduler including a N×kM scheduler for adjusting data transmission between N-pieces of input interface means, where N is a positive integer, and kM-pieces of output interface means, where M is a positive integer and k is an integer not less than two, comprising:

k-pieces of N×M schedulers to be said N×kM scheduler; and (k−1)-pieces of selection means for switching allocated output port information input from an outside of said N×kM scheduler and information from one of said N×M schedulers at a front step so as to be input to another one of said N×M schedulers as allocated output port information;

wherein an operation of said N×kM scheduler or an operation of said N×M schedulers having k-pieces of priority classes is set freely with switching operation of said (k−1)-pieces of selection means.

17. A multi-mode scheduling method used in a N×kM scheduler for adjusting data transmission between N-pieces of input interface means, where N is a positive integer, and kM-pieces of output interface means, where M is a positive integer and k is an integer not less than two, comprising:

forming said N×kM scheduler from k-pieces of N×M schedulers ; and switching, in (k−1)-pieces of selection circuits, allocated output port information input from an outside of said N×kM scheduler and information from one of said N×M schedulers at a front step so as to be input to another one of said N×M schedulers as allocated output port information;

wherein an operation of said N×kM scheduler or an operation of said N×M schedulers having k-pieces of priority classes is set freely with switching operation of said (k−1)-pieces of selection circuits.

* * * * *